(12) United States Patent
Talmor et al.

(10) Patent No.: US 11,044,604 B2
(45) Date of Patent: Jun. 22, 2021

(54) METHOD AND SYSTEM FOR PROTECTING AND UTILIZING INTERNET IDENTITY, USING SMARTPHONE

(71) Applicant: Eli Talmor, Haifa (IL)

(72) Inventors: Eli Talmor, Haifa (IL); Rita Talmor, Haifa (IL)

(*) Notice: Subject to any disclaimer, the term of this patent is extended or adjusted under 35 U.S.C. 154(b) by 0 days.

(21) Appl. No.: 15/774,012

(22) PCT Filed: Nov. 8, 2016

(86) PCT No.: PCT/IB2016/056712
§ 371 (c)(1),
(2) Date: May 7, 2018

(87) PCT Pub. No.: WO2017/081603
PCT Pub. Date: May 18, 2017

(65) Prior Publication Data
US 2018/0324151 A1    Nov. 8, 2018

Related U.S. Application Data

(60) Provisional application No. 62/253,169, filed on Nov. 10, 2015.

(51) Int. Cl.

| | |
|---|---|
| *H04W 12/06* | (2021.01) |
| *H04L 29/06* | (2006.01) |
| *G06Q 20/32* | (2012.01) |
| *G06Q 20/40* | (2012.01) |
| *G06Q 20/36* | (2012.01) |
| *G06Q 20/34* | (2012.01) |

(Continued)

(52) U.S. Cl.
CPC ............ *H04W 12/06* (2013.01); *G06Q 20/32* (2013.01); *G06Q 20/322* (2013.01); *G06Q 20/351* (2013.01); *G06Q 20/36* (2013.01); *G06Q 20/3823* (2013.01); *G06Q 20/3829* (2013.01); *G06Q 20/4012* (2013.01); *G06Q 20/4014* (2013.01); *G06Q 20/40145* (2013.01); *H04L 9/083* (2013.01); *H04L 9/0869* (2013.01); *H04L 63/0414* (2013.01); *H04L 63/0428* (2013.01); *H04L 63/083* (2013.01); *H04L 63/0861* (2013.01); *H04M 1/0202* (2013.01); *G06Q 2220/00* (2013.01); *H04L 63/107* (2013.01); *H04W 4/02* (2013.01); *H04W 4/12* (2013.01)

(58) Field of Classification Search
None
See application file for complete search history.

(56) References Cited

U.S. PATENT DOCUMENTS

2011/0047608 A1* 2/2011 Levenberg .......... H04L 63/0807
726/7

* cited by examiner

*Primary Examiner* — Kaveh Abrishamkar

(57) ABSTRACT

The present invention enables secure identification, transactions or access using smartphones. The present invention presents a method and a system for secure identification, transaction and access, comprising an interaction between a user; a smartphone of the user; a software application, enabling the user to communicate with a Relying-Party-Service-Provider and; an Identity-Management-as-a-Service, performing identity verification of the user, using software application; and a Relying-Party-Service-Provider, performing transaction and access of the user. Relying-Party-Service-Provider may be one of the group consisting of Banks, Financial Services, Online Shops, Online Voting, Enterprise Websites, Smart Home, Mobile and Web applications.

20 Claims, 8 Drawing Sheets

(51) Int. Cl.
  *G06Q 20/38* (2012.01)
  *H04L 9/08* (2006.01)
  *H04M 1/02* (2006.01)
  *H04W 4/12* (2009.01)
  *H04W 4/02* (2018.01)

METHOD AND SYSTEM FOR PROTECTING AND UTILIZING INTERNET IDENTITY, USING SMARTPHONE

The present invention claims the benefits of Provisional U.S. Patent Application 62/253,169.

TECHNICAL FIELD

The present invention is in the field of Information Technology (IT) Security. More specifically it refers to user, willing to access an Internet site or authorize transaction over the Internet, based on his/her Identity, using his/her smartphone. A smartphone is a cellular telephone with an integrated computer and other features not originally associated with telephones, such as an operating system, Web browsing and the ability to take photo and video and to run software applications.

BACKGROUND ART

The architecture of Identity Software-as-a-Service (SaaS) systems is based on concept of service providers or Relying-Party-Service-Providers, identity provider or Identity-Management-as-a-Service and clients or users (see for example U.S. Pat. No. 8,205,247 B2). Relying-Party-Service-Providers enable user's access and transactions, using variety of Internet services. Identity-Management-as-a-Service verifies user's identity.

Previously filed Provisional Application 62/181,785 "Method and system for secure identification, transaction and access using smartphone" may be summarized as following: "The present invention enables secure identification, transactions or access using endpoint devices, such as computers, tablets, smart-phones or IoT devices. These endpoint devices may be potentially compromised with malicious software or may have limited display and storage capabilities. The present invention presents a method and a system for secure identification, transaction and access, comprising an interaction between a user; a smartphone of the user; an endpoint device, performing communication of the user with a Relying-Party-Service-Provider and; an Identity-Management-as-a-Service, performing identity verification of the user; and a Relying-Party-Service-Provider, performing transaction and access of the user. The user uses an imaging device of said smartphone to interact with the Identity-Management-as-a-Service and the Relying-Party-Service-Provider and to record the transaction or access request between the user and the Relying-Party-Service-Provider, the said request being identified by Session ID attached to said access or transaction."

The present invention teaches how to use smartphone application's software interaction to execute Session ID mechanism, without the usage of imaging device.

It is well known that Identity Theft is rampant, whereas Personal Identifiable Information (PII) are stolen and sold on the black market. This Information may include static info such as Name as well as dynamic info such as Credit Card Number. Personal Identity attributes are Static. Once stolen—they remain stolen forever. Stolen information leads to Identity Fraud, with serious financial consequences.

Application 62/181,785 teaches the solution to the problem of Identity Theft, whereas Internet Identity is a collection of personal attributes, stored encrypted on the cloud, dynamically bound to a collection of proprietary smartphone identifiers, sampled in real-time.

The present invention adds the solution to the problem of Dynamic Identity Information theft, such as Credit Card Number, whereas Protected Card is Payment Card info, stored encrypted on the cloud, dynamically bound to a collection of proprietary smartphone identifiers, sampled in real-time. Payment Card info cannot be used without the Identity-Management-as-Service, for example in Shops. Therefore it should be Virtual Card, not card "in plastic". The present invention also enables Internet Payments without the use Credit Card Network using EU PSD2 regulation [1].

the present invention also teaches how to protect critical transaction data from being modified by malicious software. The present invention also teaches how to implement a low-friction strong authentication for a User, whereas the User does not need to leave Relying Party Smartphone application in order to verify his/her Identity.

One of the use cases of the present invention is Internet payments. To this end the present invention offers the following benefits for E-Merchants and Consumers:
  Eliminate Internet Fraud for Card-Not-Present Transactions,
  "Tap and Buy" Consumer Experience (no shopping cart abandonment) on any Smart-phone.
Another use case is online banking. To this end the present invention offers the following benefits for Banks and Consumers:
  Eliminate Internet Fraud for Third-Party Money Transfers,
  "Tap and Transfer" Consumer Experience on any Smart-phone.
Another use case is online voting. To this end the present invention offers the following benefits to the Voters:
  The Voter is Identified, but the vote is anonymous,
  The Vote integrity is preserved,
  The interaction with the Voter is seamless,
  The Voting process is protected from hackers and malware.
Another use case is Smart Homes and Connected Cars. To this end the present invention offers the following benefits to the Home and Car Owners:
  Setting Home Alarm systems on/off in "One Tap",
  Setting Car Immobilizer on/off in "One Tap".

SUMMARY OF INVENTION

Technical Problem

The problem to be solved is the need to protect Personal Identifiable Information (PII), so that it cannot be stolen, to authenticate the user in real-time and to execute user's request for transaction on smartphone, so that the whole process will be secure from malicious attacks.

Solution to the Problem

The user willing to execute request for access or transaction vs. Relying-Party-Service-Provider (bank, online shop, smart home, etc.) is requested to perform strong authentication vs. Identity-Management-as-a-Service Provider (where user is already registered). The present invention separates user authentication (vs. Identity-Management-as-a-Service), user action-request (vs. Relying-Party-Service-Provider) and action-request-authorization (between Relying-Party-Service-Provider and Identity- Management-as-as-Service) into three steps, introducing novel 3-step verification, including the following distinctive features:

1. The present invention changes the verification topography from user-centric (user is the last node to request authorization) to service-centric (service is the last node to request authorization). This topography change is crucial in malware environment, since user's smartphone are potentially malware compromised, while service provider's network and computers are generally malware free.
2. The present invention provides for secure messaging or data transfer between Relying Party transaction/access smartphone app. and Identity smartphone app. or Identity External Library for smartphone app. followed by strong authentication performed by Identity-Management-as-a-Service.

This data transfer is preferably executed within separated Trusted Execution Environment (TEE) [2]. The TEE offers a level of protection against attacks that have been generated in the SmartPhone OS environment. Alternatively, obfuscated code is pushed to the client just-in-time before it is needed, with no reuse of the same version on the same client. This makes code injection and changing of the functionality much harder. For example Android apps at execution time may download native code, writing the code to a storage directory that the app has write permission to (such as the app's internal data storage directory), and then executing the code. In such fashion mechanism is created for feeding individually customized apps with obfuscated and randomized system security and code block elements. Obfuscated code is pushed to the client, executed and removed within seconds. All dynamically provided code blocks are signed and validated before they are used by the app.

3. The present invention provides that messaging details, directly-connected with transaction or access details, to be included, in conjunction with strong identification, thus enabling context-sensitive identification.
4. The present invention provides easy integration with multiple applications and Relying-Party-Service Providers for example:

4.1 New user open account at Relying-Party-Service-Provider website
4.2 Returning user login at Relying-Party- Service-Provider website
4.3 Third party money transfer at Relying-Party -Bank website
4.4 Online store at Relying- Party- Payment Processor
4.5 Online voting at Relying-Party- Election website
4.6 Mobile application (Gaming, Financial, Dating, Smart Home)
4.7 Access to IoT device (smart home, smart car, etc.)

5. The present invention relieves Relying-Party-Service Providers from the need to identify the user and manage his Identity.

Advantageous Effects of Invention

The present invention has the advantage for being resilient to malware attacks, while being applicable to any smartphone and wide variety of applications. The further advantage is usage of widely ubiquitous mobile phone as the identification device, without the need for specialized hardware or software. The further advantage is similar, intuitive and user-friendly experience for wide variety day-to-day activities. The further advantage is ease of integration with multiple user-requested-actions and applications. The further advantage is the Identity provisioning built-in into the system.

BRIEF DESCRIPTION OF DRAWINGS

Various exemplary embodiments are illustrated by way of example, and not by way of limitation, in the figures of the accompanying drawings in which like reference numerals refer to similar elements and in which.

DESCRIPTION OF EMBODIMENTS

A system and method for conducting transactions and access using smartphones is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
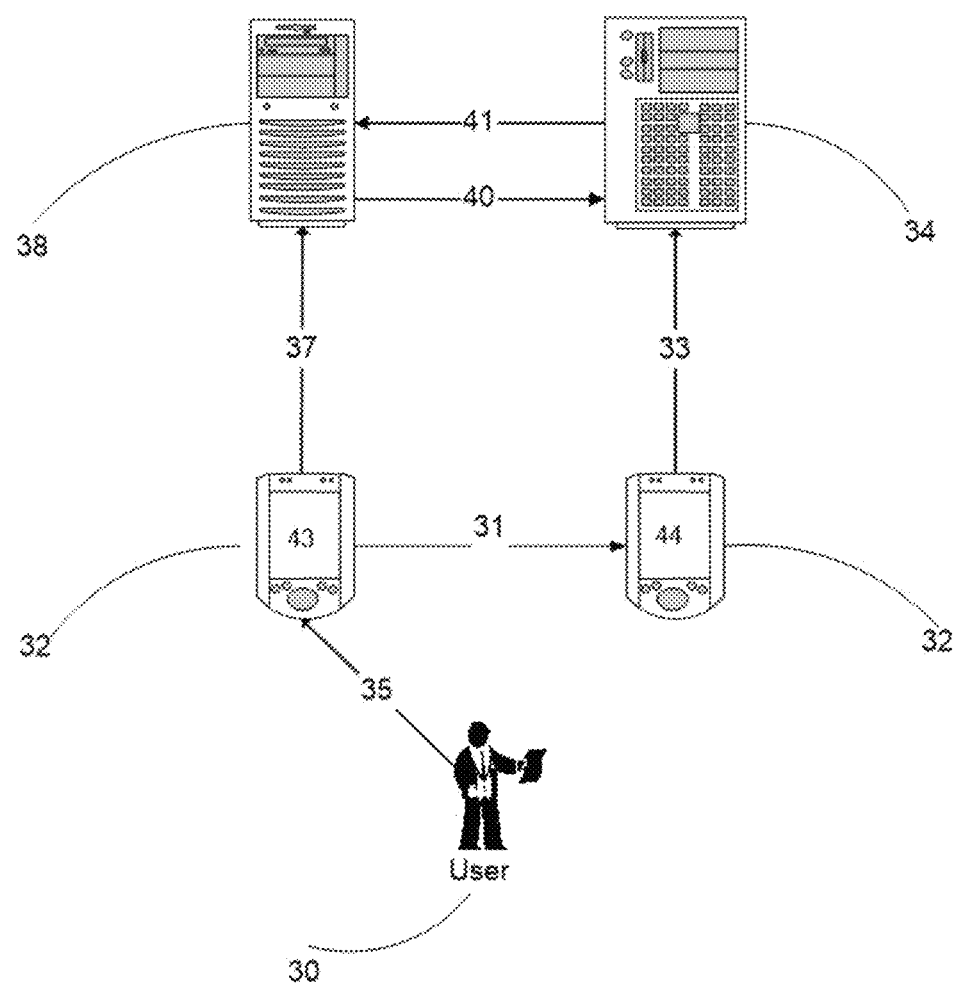
FIG. 1 is a general flowchart of the interaction between user, access/transaction smartphone application of Relying-Party-Service Provider, Identity smartphone application and Identity-Management-as-a-Service.

Referring now to FIG. 1 the embodiment of the present invention includes:
1. the user 30 interacting by tap on software button 35 with access/transaction application 43, residing on smartphone 32,
2. access/transaction application 43 interacting 37 with Relying-Party-Service Provider 38,
2. access/transaction application 43 interacting via software messaging interface 31 with Identity application 44, residing on the same smartphone 32,
3. Identity application 44 interacting via software interface 33 with Identity-Management-as-a-Service 34,
4. Relying-Party-Service Provider 38 interacting via software interface 40 with Identity-Management-as-a-Service to query for user's identity and transaction key data 41.

It is obvious that all three components of this embodiment, namely access/transaction application, smart-phone application must have software interfaces compatible to each other in order to work in harmony.

Figure 2:
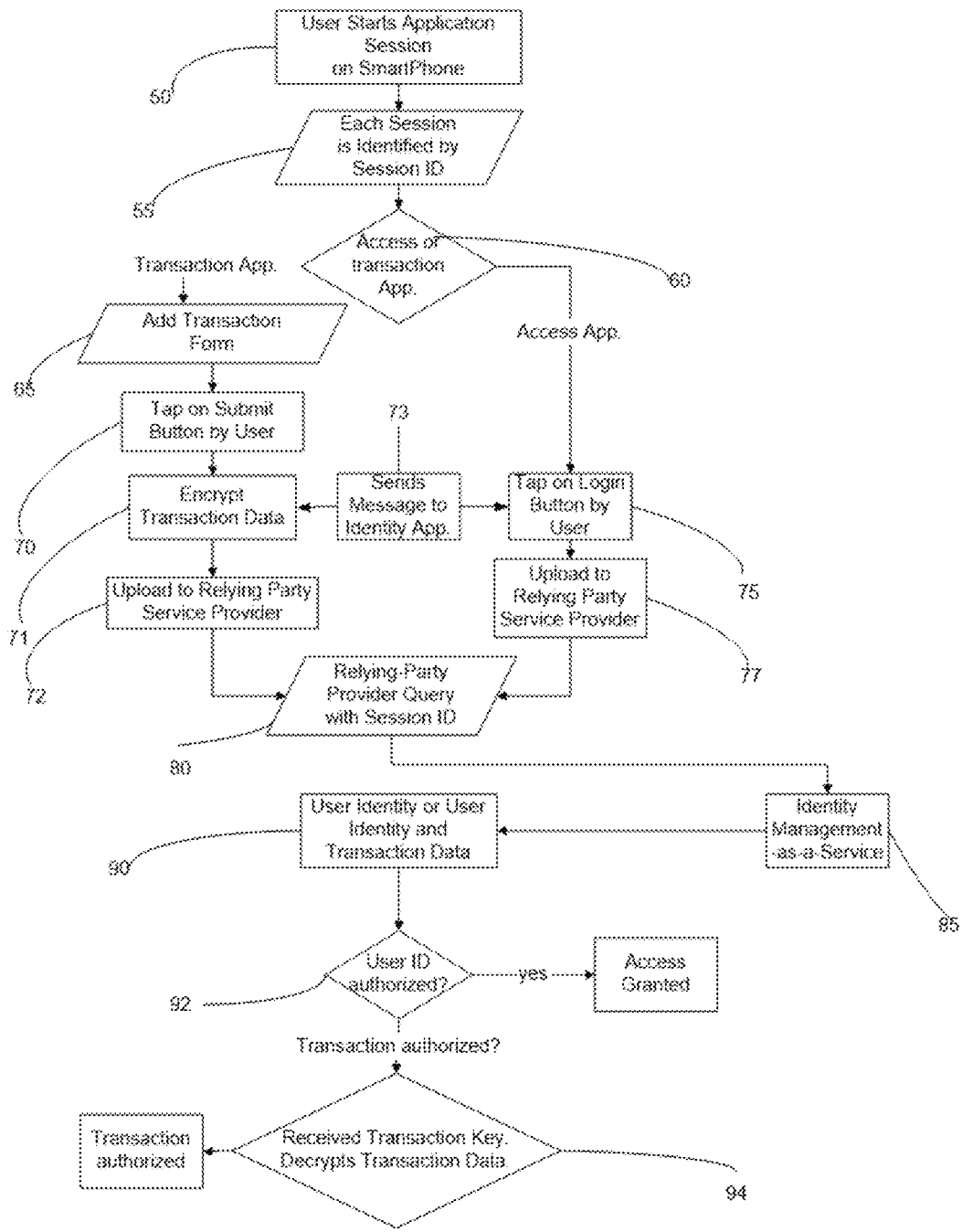
FIG. 2 is a detailed flowchart of the interaction between user and access/transaction smartphone application, followed by interaction of Relying-Party-Service Provider with Identity-Management-as-a-Service.

Referring now to FIG. 2, describing access/transaction application of Relying-Party Service Provider. This is an application for access or transactions performed on smartphone and include the following:
1. Initiating application by the user 50, identified by Session ID of the application 55,
2. Access and transaction interfaces differ 60 as following:
3. In case of transaction—filling transaction form 65 and user tap on SUBMIT—submitting the form and Session ID 70. Following that the transaction data is encrypted with randomly-generated transaction key 71. Session ID and Encrypted Transaction Data are uploaded to Relying-Party-Service Provider 72. At the same time the key and Session ID are send via Software Messaging interface 73, supported by smartphone Operating System, to Identity application residing on the same smartphone.
4. In case of access—tap on LOGIN, submitting Session ID 75. Session ID is uploaded to Relying-Party-Service Provider 77. At the same time the Session ID is sent via Software Messaging interface 73, supported by smartphone Operating System, to Identity application residing on the same smartphone.
5. Following that, Relying-Party-Service Provider queries 80 cloud-based Identity Management-as-a-Service 85 with Session ID 80. Identity-Management-as-a-Service replies with User Identity 90 (in case of access only)—granting access 92 if user's ID authorized. In case of transaction—User Identity and Transaction Key 90 is transferred, resulting in Transaction decryption 94—authorizing transaction if user's ID authorized and warrants that Transaction content was not tampered with.

Figure 3:
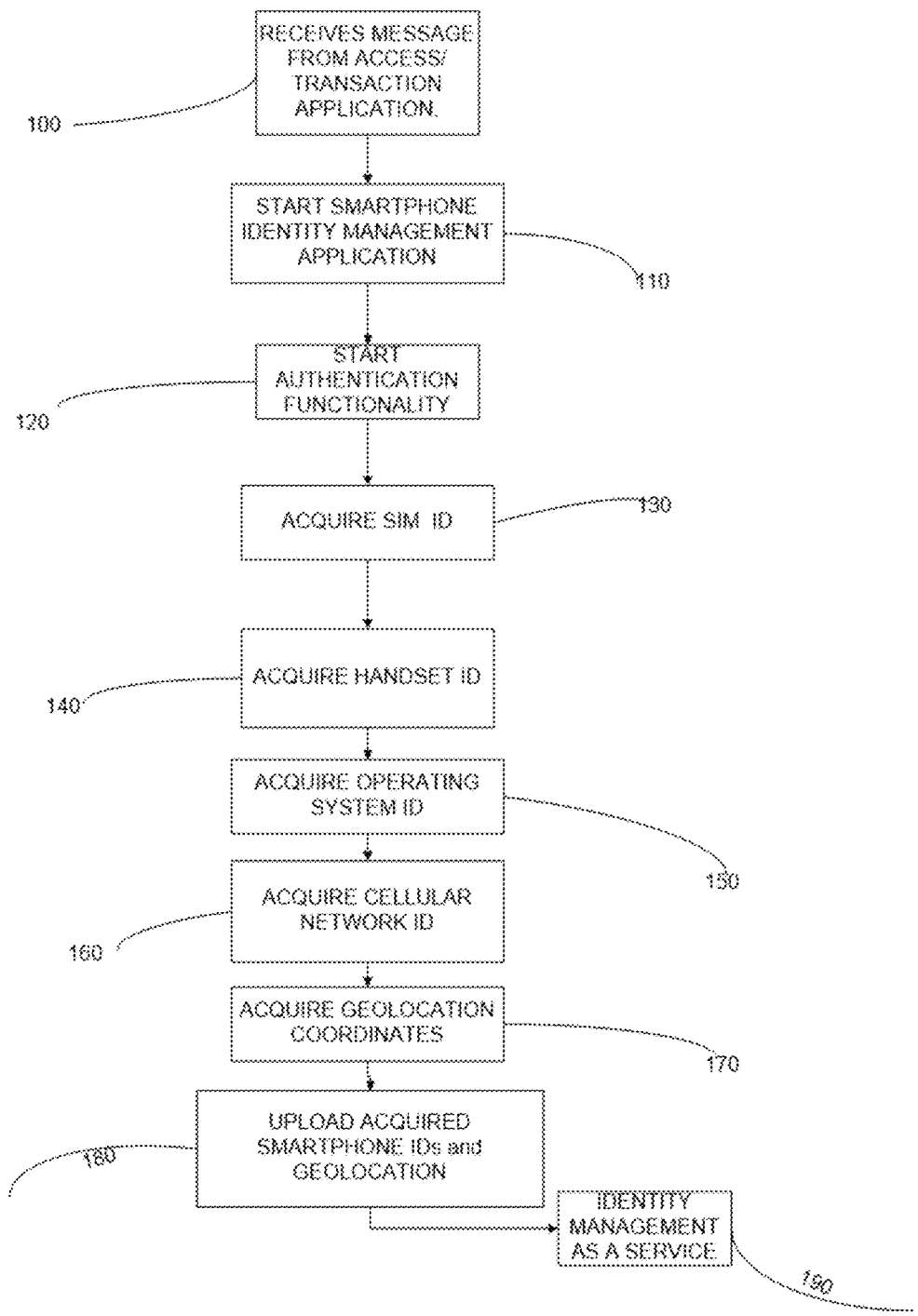
FIG. 3 is a detailed flowchart of the interaction between user and Identity smartphone application, followed by interaction of Identity smartphone application with Identity-Management-as-a-Service.

Smartphone software interface, shown in FIG. 3 includes the following steps:
1. Receiving software message 100 starts Identity management application 110 with authentication functionality 120.
2. Acquiring smartphone SIM (subscriber identification module) 130. The identifier used is ICCID (integrated circuit card identifier). This identifier is static and cannot be changed without permission.
3. Acquiring smartphone handset ID 140. The identifier used is IMEI (International Mobile Station Equipment Identity). This identifier is quazi-static and can be changed if user changes his handset.
4. Acquiring operating system ID 150. The identifier used is Smartphone OS Version Build number. This identifier is quazi-static and can be changed if user upgrades his OS.
5. Acquiring Cellular Netowork ID 160. These ID include: Cellular Network Country Identifier, Network Type, Roaming Flag, Network Operator Identifier, SIM Operator Identifier, Tower Cell Location LAC (location area code) and Tower Cell Location CID (Cell ID). Most of these parameters are quazi-static. CID is not quazi-static.
6. Acquiring Geo-location Coordinates 170. These may be either Cellular-Network Base or GPS based.

Following that Smartphone IDs with Geo-location coordinates are uploaded 180 to Identity Management as a Service 190.

Figure 4:
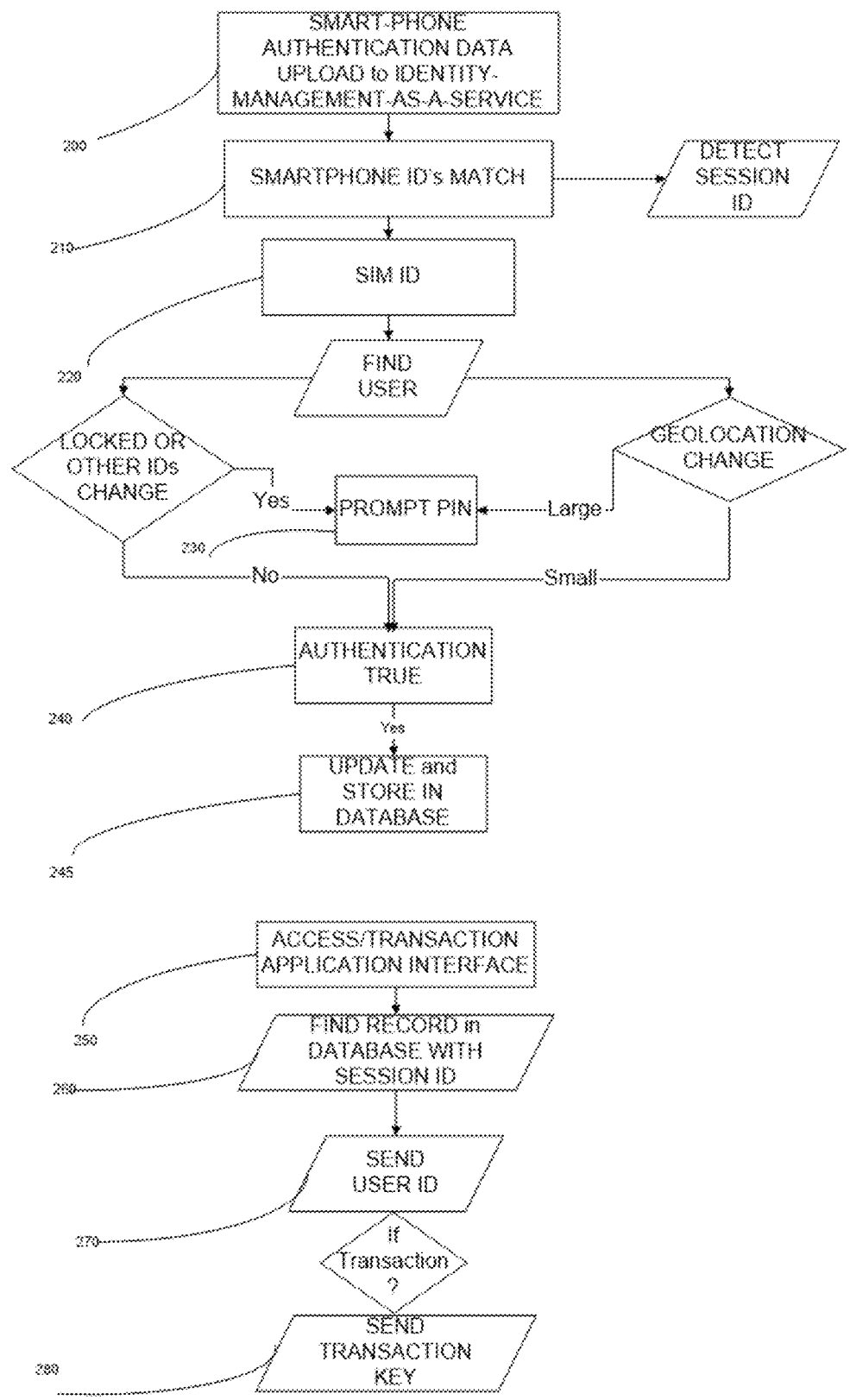
FIG. 4 is a detailed flowchart of Identity-Management-as-a-Service processing, followed by interaction between Identity-Management-as-a-Service and access/transaction smartphone application.

Referring to FIG. 4: Identity-Management-as-a-Service interface includes the following steps: smart-phone data upload 200 and matching smart-phone IDs with those stored in Identity Management as a Service database 210, including:
1. Matching SIM ID—ICCID with one stored in the database 220. If match is successful—then the Service finds other details corresponding to this user. If the smartphone is locked (to prevent from others to access Identity Application), or the Relying Party Service Provider explicitly requires or quazi-static Identity parameters have changed, then user is prompted to enter his 4-digit PIN 230. Geolocation coordinates changes are detected as following:

R(m)=6371000

φ1(Radians)=latitude 1

φ2(Radians)=latitude 2

λ1(Radians)=longitude 1

λ2(Radians)=longitude 2

$$\Delta\varphi=\varphi2-\varphi1$$

$$\Delta\lambda=\lambda2-\lambda1$$

$$\varphi_m=(\varphi1+\varphi2)/2$$

$$x=\Delta\lambda\cdot\cos\varphi_m$$

$$y=\Delta\lambda$$

$$d=R\cdot\sqrt{(x^2+y^2)}$$

If d>threshold, then user is prompted to enter his 4-digit PIN 230. For example threshold=200 m. Alternatively the threshold can be calculated differently for urban and rural scenarios: if LAC and CID has changed (indicating urban environment), then threshold can be set to 100 m (for example user is located in a Apartment), if LAC and CID has not changed (indicating rural environment) then threshold can be set to 1000 m (user is located in a Farm).

If Authentication is True 240, then quazi static parameters and geolocation coordinates are updated in the database 245.

PIN 230 can be entered using Smartphone OS keyboard or software-based keyboard similar to smartphone lock-screen keyboard. This keyboard (10-digits and OK buttons) is more convenient for numerical input.

Keystroke activity generates hardware interrupt that can be time stamped and measured up to microseconds (μs) precision. By performing simple mathematical operation to these time stamp, timing duration, or interval between consecutive keystrokes can be obtained. Timing information of two consecutive keystrokes is the major feature data represented in keystroke dynamics domain. Dwell time refers to the amount of time between pressing and releasing a single key. In other words, how long a key was held pressing down. Flight time refers to the amount of time between pressing and releasing two successive keys. It may also be termed as latency time. Additional feature is pressure exerted on smartphone touch-screen during pressing the key. Combining keystroke timing and keystroke pressure behavioral biometrics information is collected and can be used in conjunction with other identification parameters.

Access/Transaction application interface 250 involves query of the database for the record with specific Session ID 260. If the record is found in database 245—the Identity-Management-as-a-Service responds with User ID 270 and if transaction—with Transaction Key 280.

Returning again to FIG. 2: Relying-Party-Service-Provider 92 matches user's ID with user's authorization privileges and uses received transaction key from Identity-Management-as-a-Service with encrypted transaction content, that user submitted to Relying-Party—Service-Provider from the smartphone 94. This result in secure transaction, even though the smartphone used to submit the transaction online, may be insecure and compromised by malware.

Figure 5:
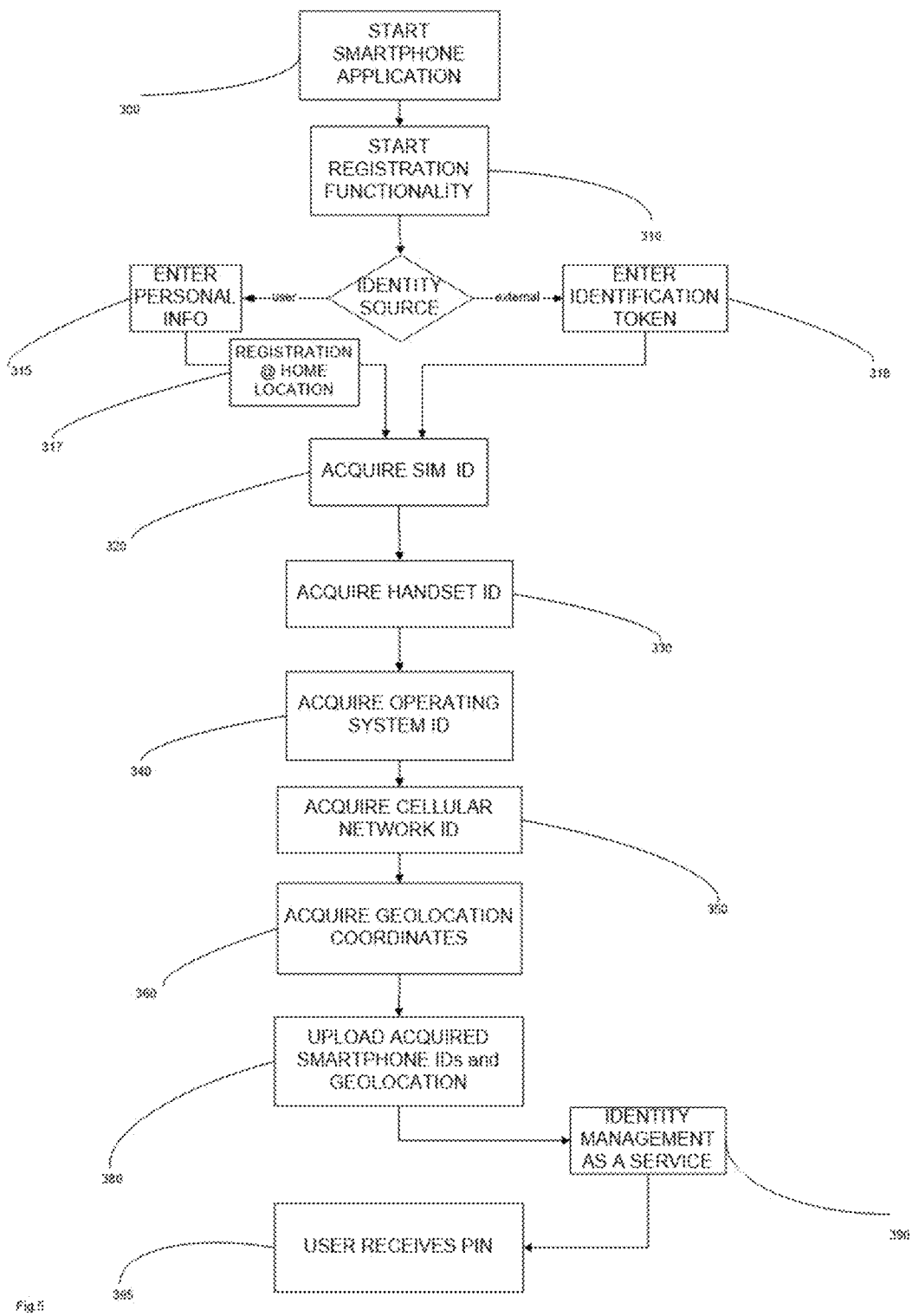
FIG. 5 is a detailed flowchart of software processing for user performing registration at Identity-Management-as-a-Service using Identity smartphone application.

Referring to FIG. 5: to initiate the usage of Identity SmartPhone application 300 with Identity-Management-as-a-Service—the user must Register his ID 310. User's Identity Source may be external—third party—such as his/her Bank or his/her Telco operator. In this case Identification Token 318 is generated by Identity-Management-as-a-Service. For example this token may be 12 digits number, whereas first 6 digits sent to user's email and last 6 digits sent to user via SMS. Alternatively user's Identity Source may be provided by user himself 315. The personal info includes:

National ID #,
Gender,
Date of Birth,
First Name, Last Name,
Home Address,
Mobile #,
Email (used for Social Media),
Social Media (Facebook, Linkedin, Twitter) link,
Enterprise Name.

For self-provided Identity—registration must be performed at claimed home location. By calculation distance d (as shown in 0019) between actual geo-location and claimed home geo-location—home address is verified in real-time.

In both cases Identity attributes are bound to smartphone Identifiers 320, 330, 340, 350, 360 and uploaded 380 to Identity-Management as a Service 390 to be stored in database. On completion user receives PIN 395.

In alternative embodiment Identity external library 44 can be integrated into Relying Party smartphone application. In this case registration process needs to be integrated seamlessly into this application. In this case, if User is not registered yet, he is prompted to enter his Basic personal attributes, such as: Gender, First Name, Last Name, Email. To verify his Identity—Social Media interface is used. To this end he is sent with URL to Facebook login to his Email. On completion—his verified Identity from Facebook is received (First Name, Last Name, Email) which is matched with self-provided Identity. Thus Identity is verified.

The set of personal attributes to be passed from Identification-as-a-Service to Relying-Party-as-a-Service is determined by Relying Party smartphone app. In some cases additional set is required on top of Basic personal attributes.

These attributes may include: National ID#, Date of Birth, Home Address.

If user did not provided these attributes in the past, he is prompted to do so. This needs to be verified separately, by Third-Party Service providers [3].

Figure 6:
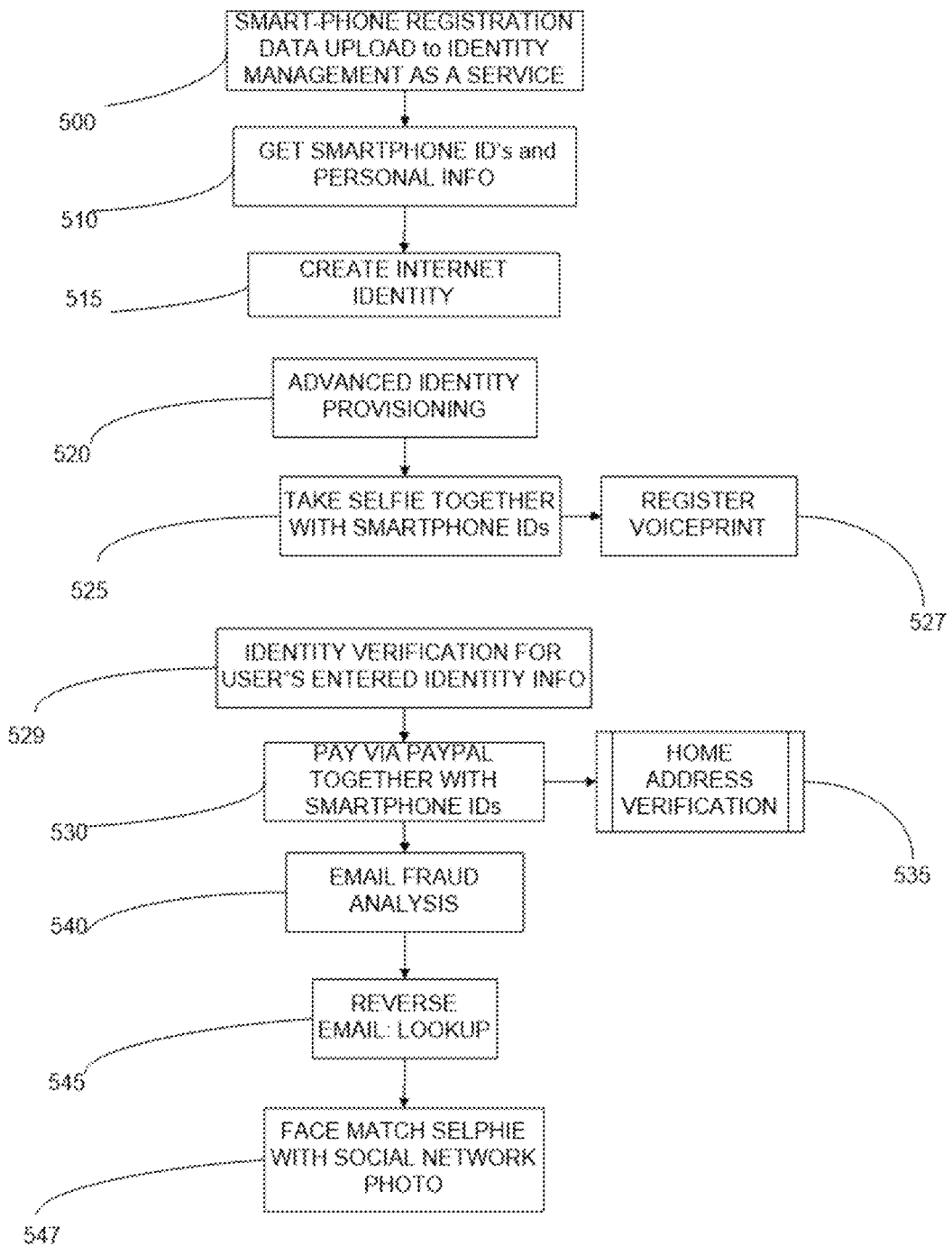
FIG. 6 is a detailed flowchart of Identity-Management-as-a-Service software processing for Advanced Identity Provisioning.

In yet another embodiment User's Identity may be verified by his/her Bank. In this case the Bank Name needs to be added as Advanced personal Attribute.

referring to FIG. 6: The data uploaded to Identity Management as a Service 500 comprising personal info and smartphone identifiers 510. Thus an Internet Identity 515 is created, representing a collection of personal attributes, stored encrypted on the cloud, dynamically bound to a collection of proprietary smartphone identifiers, sampled in real-time.

Subsequently, the user may perform Advanced Identity Provisioning 520, including the following steps:

1. Taking user's live selphie 525 out of Identity App, and uploading selphie together with SmartPhone IDs. Selphie liveness can be assured using technique called "Eulerian video magnification",[4] which teaches that by measuring the change in color—one could accurately estimate user's heart rate.
2. Requesting to register VoicePrint 527 out of Identity App. and uploading this request together with SmartPhone IDs VoicePrint registration is teached in WO 2015015366 A1. If user's identity is self-claimed 529, the following verification steps are needed:
3. Payment of small amount of $1 to Identity-Management-as-a-Service, using PayPal. This payment details forwarded by PayPal will show user's home address, thus allowing his home address verification 535.
4. Background Email Fraud Analysis 540, such as Emailage Fraud Risk Analyzer[5].
5. If such analysis shows that email address is not flagged as fraudulent—using Reverse Email Lookup to verify other personal attributes [6]
6. Face match 547 using Selphie and Social Network photo.

Figure 7:
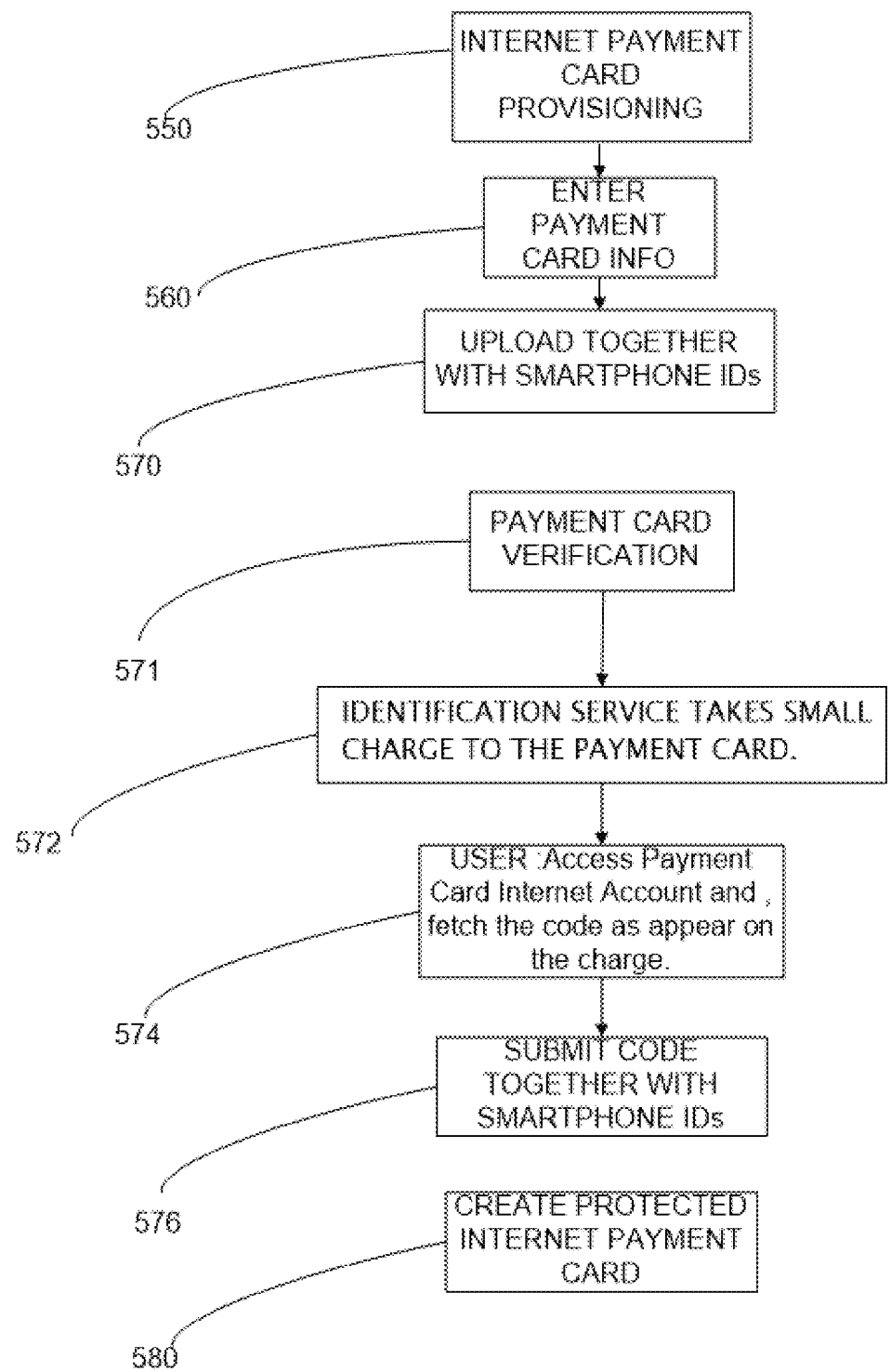
FIG. 7 is a detailed flowchart of Identity-Management-as-a-Service software processing for Internet Payment Card Provisioning.

Referring to FIG. 7: in order to Provision Internet Payment Card 550, the following steps has to be taken by the user:

1. Entering Payment Card info, using Identity smartphone app. 560.
2. Uploading Payment Card info together with smartphone IDs 570.
3. Verifying Payment Card 571, inlcuding the following steps:
   3.1 Charging the Card 572 with small fee of, say $1.
   3.2 Requesting the user 574 to access the Card Internet statement.
   3.3 Submitting the charge code 575 as appears on the Internet statement using Identity application.

Alternatively, if the user's Identity Source is the user's Bank, issuing payment card—then Payment Card details may be verified directly, without user's involvement. For example by issuing Payment Card 12-digit token and requesting the user to submit this token using Identity App, as shown in par. 0020.

In both cases—Protected Internet Payment Card is created. This Protected Card is a Payment Card info, stored encrypted on the cloud, dynamically bound to a collection of proprietary smartphone identifiers, sampled in real-time. Clearly this Payment Card info used by Protected Card cannot be used without Identity Management as a Service. Therefore this is a Virtual Card, to be used on Internet, not plastic card to be used in physical stores.

Under European Payment Services Directive PSD2—the Payment to Merchants do not necessary required Payment Card. Instead the Customer may enter his Bank Account and Payment Initiation Service Provider will contact the Bank on behalf of the Customer to authorize payment. In this case Relying Party Service Provider is Payment Initiation Service Provider.

For high risk transaction it is advantageous to add Voice-interaction as described in WO 2015015366 A1.

The preferred embodiment of present invention uses Voice Biometrics (as described in U.S. Pat. Nos. 5,913,196 and 6,510,415) to prevent malware attacks on voice interaction channel between the user and the Identity-Management-as-a-Service. The Voice Biometrics match is performed on Identity-Management-as-a-Service side, using the voice data provided by the user during the interaction with the Identity-Management-as-a-Service.

Figure 8:
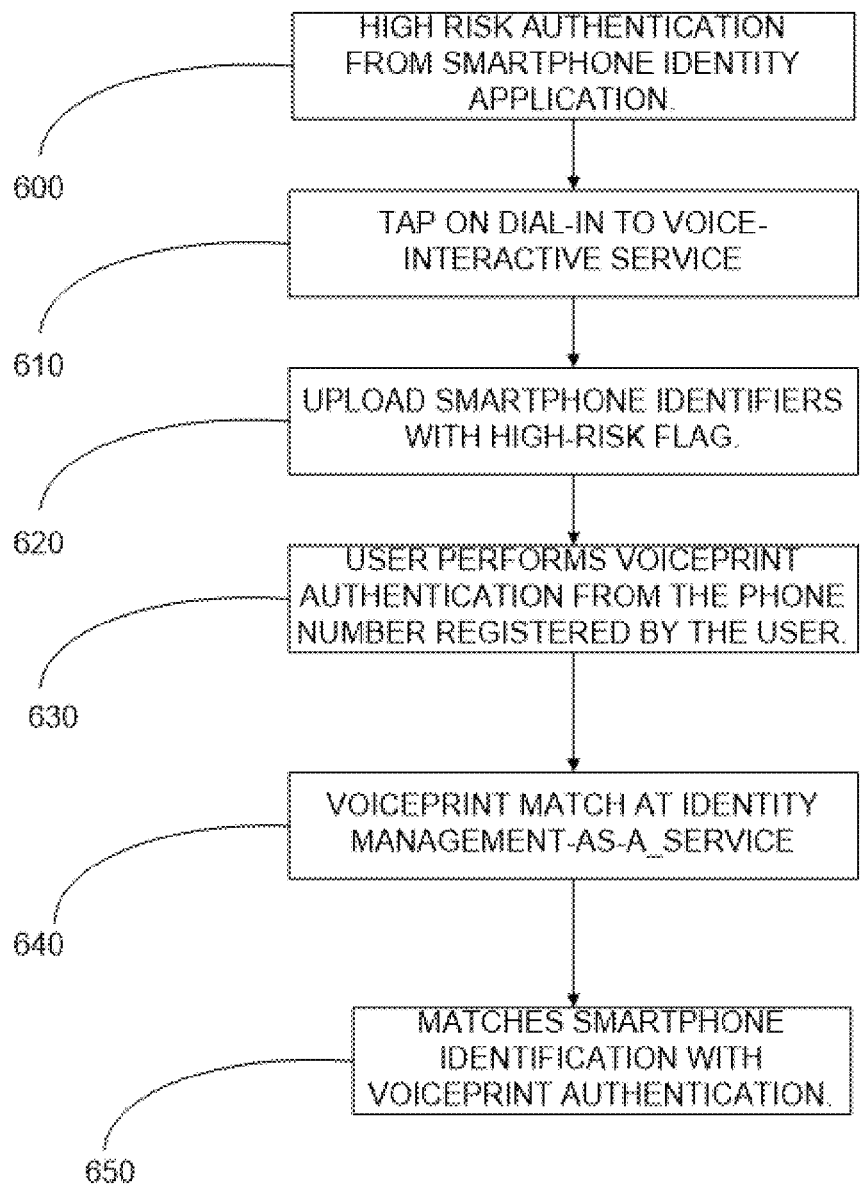
FIG. 8 is a detailed flowchart of Identity-Management-as-a-Service software processing of high-risk Voiceprint authentication, using Identity smartphone application.

Refering to FIG. 8: to include VoicePrint authentication 600 into Identity app. the following steps are taken:
1. user taps the button to dial-in to Voice-Interactive service 610
2. Smartphone Identifiers are uploaded with High-Risk Flag 620
3. User performs VoicePrint authentication 630, using his own smartphone, as described in WO 2015015366 A1.
4. The VoicePrint match 640 is performed at Identity Management as a Service.
5. Smartphone Identification is matched with VoicePrint Authentication 650 using Caller ID number as a key.

European Payment Services Provider Directive PSD2[1] defines risk as follows: when the payer accesses his payment account online; initiates an electronic payment transaction or carries out any action, through a remote channel, which may imply a risk of payment fraud or other abuses. Transactions less than 10 euro are deemed as low risk, while transaction above 10 euro require Strong Authentication to include 2 out of 3 elements, including knowledge (such as PIN), ownership (such as smartphone) and inherence (such as biometrics).

To comply with PSD2 the present invention will include Risk parameter data transfer from Relying Party (E-Merchant) smartphone application to Identity External Library 44. When External Library receives Risk parameter—it will decide whether or not PIN prompting is required or whether or not VoicePrint authentication is required. Geolocation and Touchscreen behavioral matching will be performed in the background and the result will be transferred to the Relying Party—Payment Initiation Service Provider.

The security features of the proposed invention are as following:
PassCode or Fingerprint match to access smart-phone handset,
Encrypted communication between Transaction/Access Application, Identity Application and Identity-Management-as-a-Service,
Multi-Factor Hardware Identifier of the Handset,
Identity app. lock/unlock using PIN,
Live Network Identification [7]
Dynamic Geo-location Threshold,
Touchscreen Interaction authentication
Dynamic Session ID identifier—precluding replay attack,
Dynamic binding of Identity attributes, stored encrypted on the cloud to user's handset,
Kill-switch in case of lost/stolen handset,
No data stored on handset,
Low attack surface of the Identity-Management-as-a-Service, In this context: there are a number of attacks possible against this invention and their corresponding remedies:
1. Remotely attacking Identity-Management-as-a-Service server in order steal data for impersonation, such as Identity attributes and/or handset identifiers.
Remedy: stealing Identity attributes does not help the attacker, since the user registering twice will still need to verify his/her Identity online with Third-Party such as his/her Bank.
2. Stealing handset identifier will require in addition generating handset cloning.
Remedy: that may be prevented by Radio fingerprinting [7] by cellular operators. Smartphone not connected to cellular network is precluded from using this system.
3. Remotely attacking lots smartphone devices in order to misuse authenticated sessions, such as replay Session ID.
Remedy: stealing Session ID does not help remote attacker since it is invalid for any other session.
4. Physically attacking smartphone devices (3% of lost or stolen devices in US).
Remedy: Handset access must be protected by passcode or fingerprint. User may remotely disable the device using kill switch. User should report that device is lost or stolen in order to disable it and request to re-register. PIN entry should be limited to few (say 5) attempts to prevent random guessing, touch screen interaction matching provides additional level of protection.

any one of quazi-static handset identifier can be changed in legitimate way, by entering PIN during authentication. These identifiers include:
Network ID—while traveling abroad,
OS ID—while Operating system upgrade,
IMEI and OS ID—while handset upgrade.
Therefore Identity-Management-as-a-Service can dynamically update its records to allow these changes.
In case that SIM is changed—the user must re-register and to provide his Live Selphie, to be matched against previous selphie. If matched—the change will be permitted. Alternatively-SIM change will require re-registration.

While the foregoing written description of the invention enables one of ordinary kill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

CITATION LIST

Patent Literature
(1) U.S. Pat. No. 8,205,247 B2
(2) U.S. 62/181,785
(3) U.S. Pat. No. 5,913,196
(4) U.S. Pat. No. 6,510,415
(5) WO 2015015366 A 1
(6) U.S. 62/253,169.

Non-Patent Literature
(1) About EU PSD2 regulation: http://eur-lex.europa.eu/legal-content/EN/TXT/?uri=CELEX:32015L2366
(2) About TEE: https://en.wikipedia.org/wiki/Trusted_execution_environment
(3) About Third-Party Identity Providers, such as Trulioo: (https://www.trulioo.com).
(4) About "Eulerian video magnification": http://people.csail.mit.edu/mrub/vidmag/
(5) About Email Fraud Analysis: https://www.emailage.com
(6) About Reverse Email Lookup: https://www.fullcontact.com/developer/
(7) About Radio Fingerprinting: https://en.wikipedia.org/wiki/Radio_fingerprinting

What is claimed is:
1. A system for online identification and transaction authentication, resulting in more security and less user's friction, comprising:
a. Relying-Party-Service-Provider for an online transaction or access of a user and requesting said user to perform strong identification with Remote Identity-Management-as-a-Service, wherein online identification and transaction authentication are performed simultaneously, being linked together into a joint process, said joint process being facilitated by keys transfer;
   b. said Remote Identity-Management-as-a-Service for Identity Provisioning and Verification of the user using an Identity software application and serving remotely said Relying-Party-Service-Provider;
   c. said joint process, wherein each transaction or access session is identified by session ID, session Risk and transaction key, being generated by Relying Party-Service-Provider and subsequently transferred to the Identity-Management-as-a-Service;
   d. said joint process, wherein said transaction key is used by Relying Party-Service-Provider to encrypt transaction request content, so that transaction key is a shared secret between the user of the transaction request, Identity-Management-as-a-Service Provider, and Relying-Party-Service-Provider;
   e. said joint process, wherein said session Risk determines the strength of authentication of the said software application of said Identity-Management-as-a-Service;
   f. said joint process, wherein said Relying Party-Service Provider and said Identity-Management-as-a-Service receive the same session ID from the user;
   g. said joint process, wherein said transaction or access authorization is requested by said Relying-Party-Service-Provider, using said Session ID, from said Identity-Management-as-a-Service;
   h. said joint process, wherein said transaction or access authorization request by Relying-Party-Service-Provider is being responded by Identity-Management-as-a-Service with said user Identity and said transaction key;
   i. said joint process, wherein said Relying-Party-Service Provider authenticates transaction or authorizes access, depending on said user's Identity and transaction key match for decryption of transaction content, as received from said Identity-Management-as-a-Service.

2. The system of claim 1 where the user interacts with the Relying-Party-Service-Provider using dedicated, Relying-Party-Service-Provider smartphone application, wherein this application also communicates with Identity smartphone application or Identity External Library.

3. The system of claim 1 where Identity smartphone application performs user's Identity Provisioning, including one or more of the attributes from the group comprising of:
   a. National ID #;
   b. Gender;
   c. Date of Birth;
   d. First Name, Last Name;
   e. Home Address;
   f. Mobile #;
   g. Email (used for Social Media);
   h. Social Media (Facebook, Linkedin, Twitter) link;
   i. Enterprise Name;
   j. Bank Account #;
   k. Payment Card #.

4. The system of claim 1 where Identity smartphone application performs user's Identity Verification, including one or more of the attributes including any combination of:
   a. said smartphone hardware identifiers, from the group comprising of:
      Smartphone SIM, Smartphone IMEI and Smartphone OS version build number,
   b. said smartphone location identifiers, from the group comprising of :
      Cellular Network Country Identifier, Network Type, Roaming Flag, Network Operator Identifier, SIM Operator Identifier, Tower Cell Location LAC (location area code), Tower Cell Location CID (Cell ID) and Geo-location Coordinates (either Cellular-Network Base or GPS based),
   c. user's PIN entered by the said user via said smartphone,
   d. user's behavioral biometrics, measured while entering said PIN during Touchscreen Interaction by the said user.

5. The system of claim 4 where the strength of authentication is dependent on session Risk as following:
   a. for low Risk no PIN is required;
   b. for high Risk PIN is required.

6. The system of claim 3 where Relying-Party-Service Provider does not store user's Identity attributes and user does not enter those attributes when using the services of Relying-Party-Service Provider.

7. The system of claim 1 wherein the transaction key corresponds to the transaction content request and to the Identity of the user executing said transaction content.

8. The system of claim 3, where user's Identity attributes are stored in the said, cloud-based, Identity-Management-as-a-Service and are dynamically bound to smartphone hardware identifiers.

9. The system of claim 3 where user's Identity attributes are submitted online by the user to the Identity Management-as-a-Service using the smart-phone, followed by verifying user's identity with a Trusted Third Party.

10. The system of claim 1 where the Relying-Party-Service-Provider is one of the group consisting of Banking, Financial Services, Online Shops, Online Voting, Enterprise Websites , Smart Home , Smart Car , Gaming, Dating and other applications sensitive to Identity Theft and/or Identity Fraud.

11. A method for online identification and transaction authentication, resulting in more security and less user's friction, comprising:
   a. requesting a user to perform strong identification with Remote Identity-Management-as-a-Service by Relying-Party-Service-Provider for an online transaction or access of the user, wherein online identification and transaction authentication are performed simultaneously, being linked together into a joint process, said joint process being facilitated by keys transfer;
   b. identifying said user using Identity software application and said Remote Identity-Management-as-a-Service for Identity Provisioning and Verification of the user , which is serving remotely said Relying-Party-Service-Provider;
   c. executing said joint process, wherein each transaction or access session is identified by session ID, session Risk and transaction key, being generated by Relying Party-Service-Provider and subsequently transferred to the Identity-Management-as-a-Service;
   d. further executing said joint process, wherein said transaction key is used by Relying Party-Service-Provider to encrypt transaction request content, so that transaction key is a shared secret between the user of the transaction request, Identity-Management-as-a-Service Provider, and Relying-Party-Service-Provider;
   e. further executing said joint process, wherein said session Risk determines the strength of authentication of the said software application of said Identity-Management-as-a-Service;

f. further executing said joint process, wherein said Relying Party-Service Provider and said Identity-Management-as-a-Service receive the same session ID from the user;
g. further executing said joint process, wherein said transaction or access authorization is requested by said Relying-Party-Service-Provider, using said Session ID, from said Identity-Management-as-a-Service;
h. further executing said joint process, wherein said transaction or access authorization request by Relying-Party-Service-Provider is being responded by Identity-Management-as-a-Service with said user Identity and said transaction key;
i. further executing said joint process, wherein said Relying-Party-Service Provider authenticates transaction or authorizes access, depending on said user's Identity and transaction key match for decryption of transaction content, as received from said Identity-Management-as-a-Service.

12. The method of claim 11 further comprising the user interacting with the Relying-Party-Service-Provider using dedicated, Relying-Party-Service-Provider smartphone application, wherein this application is also communicating with Identity smartphone application or Identity External Library.

13. The method of claim 11 further comprising the user performing Identity Provisioning using Identity smartphone application, including one or more of the attributes from the group, further comprising of:
   a. National ID #;
   b. Gender;
   c. Date of Birth;
   d. First Name, Last Name;
   e. Home Address;
   f. Mobile #;
   g. Email (used for Social Media);
   h. Social Media (Facebook, Linkedin , Twitter) link;
   i. Enterprise Name;
   j. Bank Account #;
   k. Payment Card #.

14. The method of claim 11 further comprising the user, performing Identity Verification using Identity smartphone application, including one or more of the attributes including any combination of:
   e. said smartphone hardware identifiers, from the group comprising of:
      Smartphone SIM, Smartphone IMEI and Smartphone OS version build number,
   f. said smartphone location identifiers, from the group comprising of:
      Cellular Network Country Identifier, Network Type, Roaming Flag, Network Operator Identifier, SIM Operator Identifier, Tower Cell Location LAC (location area code), Tower Cell Location CID (Cell ID) and Geo-location Coordinates (either Cellular-Network Base or GPS based),
   g. user's PIN entered by the said user via said smartphone,
   h. user's behavioral biometrics, measured while entering said PIN during Touchscreen Interaction by the said user.

15. The method of claim 14 further comprising the user performing authentication where the strength of said authentication is depending on session Risk as following:
   c. for low Risk no PIN is required;
   d. for high Risk PIN is required.

16. The method of claim 13 wherein Relying-Party-Service Provider does not store user's Identity attributes and user does not enter those attributes when using the services of Relying-Party-Service Provider.

17. The method of claim 11 wherein the transaction key is corresponding to the transaction content request and to the Identity of the user executing said transaction content.

18. The method of claim 13, wherein user's Identity attributes are stored in the said, cloud-based, Identity-Management-as-a-Service and are dynamically bound to smartphone hardware identifiers.

19. The method of claim 11 wherein user's Identity attributes are submitted online by the user to the Identity Management-as-a-Service using the smart-phone, followed by verifying user's identity with a Trusted Third Party.

20. The method of claim 11 wherein the Relying-Party-Service-Provider is one of the group consisting of Banking , Financial Services , Online Shops , Online Voting, Enterprise Websites , Smart Home , Smart Car , Gaming, Dating and other applications sensitive to Identity Theft and/or Identity Fraud.

* * * * *